US009458391B2

United States Patent
Wheeler (10) Patent No.: US 9,458,391 B2
(45) Date of Patent: Oct. 4, 2016

(54) SOLVENT EXTRACTION PROCESS TO STABILIZE, DESULPHURIZE AND DRY WIDE RANGE DIESELS, STABILIZED WIDE RANGE DIESELS OBTAINED AND THEIR USES

(71) Applicant: Envirollea Inc., Calgary (CA)

(72) Inventor: Lucie B. Wheeler, Calgary (CA)

(73) Assignee: ENVIROLLEA INC., Calgary (CA)

( * ) Notice: Subject to any disclaimer, the term of this patent is extended or adjusted under 35 U.S.C. 154(b) by 0 days.

(21) Appl. No.: 14/644,628

(22) Filed: Mar. 11, 2015

(65) Prior Publication Data

US 2015/0184084 A1 Jul. 2, 2015

Related U.S. Application Data

(63) Continuation of application No. 13/591,772, filed on Aug. 22, 2012, now Pat. No. 8,999,147, which is a continuation of application No. PCT/CA2011/050117, filed on Feb. 28, 2011.

(30) Foreign Application Priority Data

| Mar. 1, 2010 | (CA) | 2694821 |
|---|---|---|
| Mar. 1, 2010 | (CA) | 2694850 |
| Mar. 1, 2010 | (CA) | 2694853 |

(51) Int. Cl.
*C10G 29/20* (2006.01)
*B01D 11/04* (2006.01)
(Continued)

(52) U.S. Cl.
CPC .......... *C10G 21/28* (2013.01); *B01D 11/0434* (2013.01); *C10G 21/06* (2013.01);
(Continued)

(58) Field of Classification Search
CPC .. B01D 11/0434; C10G 21/06; C10G 21/12; C10G 21/16; C10G 21/20; C10G 21/22; C10G 21/27; C10G 21/28; C10G 55/06; C10L 1/08
See application file for complete search history.

(56) References Cited

U.S. PATENT DOCUMENTS

| 2,994,660 A | 8/1961 | Reddie et al. |
| 4,405,448 A | 9/1983 | Googin et al. |

(Continued)

FOREIGN PATENT DOCUMENTS

| CA | 456448 | 5/1949 |
| CA | 456599 | 5/1949 |

(Continued)

OTHER PUBLICATIONS

McClellan, A.L. (1963). Tables of Experimental Dipole Moments, W.H.Freeman and Co, San Francisco, 431 pgs [Office action cites pp. 74-75 & 134].*

(Continued)

*Primary Examiner* — Brian McCaig
(74) *Attorney, Agent, or Firm* — Bereskin & Parr LLP/S.E.N.C.R.L., s.r.l.

(57) ABSTRACT

A process allowing the removal of contaminants from an unstable oil such as those produced by thermal or catalytic cracking, wherein, in at least one step of the process, mixing of the unstable oil with a pure or impure solvent having a dipole moment greater than 2 is performed. The stabilized diesels thereby obtained exhibit interesting properties among which significant stability features and are useful in numerous applications, some of these stabilized wide range diesels are new as well as their uses.

17 Claims, 4 Drawing Sheets

(51) Int. Cl.
  C10G 21/06 (2006.01)
  C10G 21/12 (2006.01)
  C10G 21/16 (2006.01)
  C10G 21/20 (2006.01)
  C10G 21/22 (2006.01)
  C10G 21/27 (2006.01)
  C10G 21/28 (2006.01)
  C10G 55/04 (2006.01)
  C10G 55/06 (2006.01)
  C10L 1/08 (2006.01)

(52) U.S. Cl.
  CPC ............ *C10G 21/12* (2013.01); *C10G 21/16* (2013.01); *C10G 21/20* (2013.01); *C10G 21/22* (2013.01); *C10G 21/27* (2013.01); *C10G 55/04* (2013.01); *C10G 55/06* (2013.01); *C10L 1/08* (2013.01); *C10G 2300/1007* (2013.01); *C10G 2300/1055* (2013.01); *C10G 2300/1077* (2013.01); *C10G 2300/201* (2013.01); *C10G 2300/202* (2013.01); *C10G 2300/30* (2013.01); *C10G 2300/301* (2013.01); *C10G 2300/4006* (2013.01); *C10G 2300/4012* (2013.01); *C10G 2300/4081* (2013.01); *C10G 2300/44* (2013.01); *C10G 2400/04* (2013.01); *C10G 2400/10* (2013.01)

(56) References Cited

U.S. PATENT DOCUMENTS

| | | | |
|---|---|---|---|
| 4,711,713 | A | 12/1987 | Zarrineghbal et al. |
| 4,746,420 | A | 5/1988 | Darian et al. |
| 5,059,303 | A | 10/1991 | Taylor et al. |
| 5,154,817 | A | 10/1992 | Reid |
| 5,494,572 | A | 2/1996 | Horii et al. |
| 5,753,102 | A | 5/1998 | Funakoshi et al. |
| 5,904,838 | A | 5/1999 | Kalnes et al. |
| 6,274,785 | B1 | 8/2001 | Gore |
| 6,320,090 | B1 | 11/2001 | Sherman et al. |
| 6,929,737 | B2 | 8/2005 | Sherman et al. |
| 7,354,462 | B2 | 4/2008 | O'Rear |
| 8,999,147 | B2 | 4/2015 | Wheeler |
| 2004/0231237 | A1 | 11/2004 | Boer et al. |
| 2005/0167337 | A1 | 8/2005 | Bunger et al. |

FOREIGN PATENT DOCUMENTS

| | | |
|---|---|---|
| CA | 1287007 | 7/1991 |
| CA | 2200525 | 10/1997 |
| CA | 2245025 | 2/1999 |
| CA | 2694821 | 9/2011 |
| CA | 2694850 | 9/2011 |
| CA | 2694853 | 9/2011 |
| WO | 2011106891 | 9/2011 |

OTHER PUBLICATIONS

Publication from Dorf Ketl: "Fuel Additives as Stabilizers for Unstable Cracked Streams", 2005.
Marcus, Y. (2004), "Principles of Solubility and Solutions" in Solvent Extraction Principles and Practice, Revises and Expanded, edited by J. Rydberg et al., CRC Press, 480 pgs.
Lloyd, P.J.D. (2004), "Principles of Industrial Solvent Extraction" in solvent Extraction Principles and Practice, Revises and Expanded, edited by J. Rydberg et al., CRC Press, 480 pgs.
Cox M. et al., (2004), "Introduction to Solvent Extraction" in solvent Extraction Principles and Practice, Revises and Expanded, edited by J. Rydberg et al., CRC Press, 480 pgs.
Publication from Foster-Wheeler: "SYDEC delayed coking", 2007.

* cited by examiner

SOLVENT EXTRACTION PROCESS TO STABILIZE, DESULPHURIZE AND DRY WIDE RANGE DIESELS, STABILIZED WIDE RANGE DIESELS OBTAINED AND THEIR USES

CROSS-REFERENCE TO RELATED APPLICATIONS

The present application is a continuation of U.S. patent application Ser. No. 13/591,772 filed on 22 Aug. 2012 now U.S. Pat. No. 8,999,147, that is a continuation of PCT patent application No. PCT/CA2011/050117 filed on 28 Feb. 2011, which claims priority to Canadian patent application Nos. 2,694,821, 2,694,850 and 2,694,853 filed on 1 Mar. 2010. The content of all these applications is hereby incorporated by reference.

TECHNICAL FIELD

The invention relates to an extraction process using a polarized solvent having a dipole moment greater than 2, to stabilize wide range diesels, containing or not free radicals, such as those produced by the thermal or catalytic cracking of used oils, heavy oils, vacuum gasoils or bunkers. The new process markedly improves colour, odour and storage stability of thermally cracked gasoils so they can meet specifications. The extraction process also removes water, sulphurous compounds and chlorides when present from the wide range diesels, reduces their total acid number and increases their cetane index.

The invention also relates to a new family of wide range diesels, including those wide range diesels obtained by the process of the invention, as well as to numerous uses of the wide range diesels of the invention, and more particularly to lucrative uses and/or to some applications beneficial to the environment.

BACKGROUND

Gasoils or diesels produced from thermal or catalytic cracking processes are known to be unstable. While in storage, they form gums and polymers that can plug burner tips in furnaces or filters in engines. Further, new environmental constraints demand that these fuels reduce their sulphur, nitrogen, water and chlorides contents. Hydrotreating is commonly used in refineries to stabilize gasoils and to remove some of their contaminants. However, hydrotreating processes require high pressures and/or temperatures and the reactors must either be made of, or clad with, high alloy steels to resist hydrogen permeation in the metal walls. There must also be a hydrogen plant or pipeline close by. Because of the high costs of such units, they are only viable as part of refineries or large plants. Also, the hydrotreated oils must be dried to meet water content and appearance specifications.

Used lubricating oils are classified as hazardous products in many countries, mostly because of the additives that they contain. Of all the by-products from the oil industry, used oils pose the greatest danger to the fresh water supply. The Environmental Protection Agency (EPA) states that: "One gallon of used oil can pollute one million gallons of water". Among the processes to treat used oils for their reuse as fuel thermal cracking is a viable option for smaller facilities. More precisely, the additives in the used oil must be destroyed and removed. The main product is a wide range diesel or heating fuel. It tends to darken as soon as it comes into contact with air: it is unstable. Also, the wide range diesel has a high sulphur content, 3 or 4 times the 0.1% wt sulphur specification for heating oils in Europe, and has a bad odour.

Processes to stabilize and/or desulphurize diesel fuels produced by cracking heavier oils are well known. In refineries, hydrocracking and hydrotreating processes use hydrogen in catalytic reactors at high temperatures and pressures to achieve clear, stable diesel fuels with good burning characteristics and with sulphur contents as low as 15 ppm that meet ultra-low sulphur specifications. These processes not only require large, heavy reactors made of metals that resist hydrogen permeation, and corrosion, but also require hydrogen production plants or pipelines near-by. They are not suited for small or isolated refineries or used oil applications.

In used oil applications, the UOP Hylube process (U.S. Pat. No. 5,904,838) uses hydrogen at high temperatures and pressures to recycle the feed oil into lubricating oils. Others hydrotreat only the lube oil products, obtained by successive distillations of used oils.

Canadian Patent No. 2,245,025 (Ikura et al.) mentions that gasoil produced by thermal cracking of used oils can be stabilized using methanol extraction.

There are also processes to remove sulphur and/or water from naphtha and other light oils but these are not applicable to diesel fuels. In the solutizer process, Canadian Patents Nos. 456,448 (Border) and 456,599 (Bell et al.) mention that mercaptans and other weak acids contained in sour hydrocarbon distillates, and more particularly in gasoline distillates, would be extracted with solutizer solution, i.e. aqueous solutions of alkali metal hydroxides containing solutizers.

Hassan et al. (Journal of Applied Sciences Research, 5(5): pp. 515-521, 2009) mention that sulphur could be removed from straight run diesel fuel with a mixture of NMP (normal methyl pyridine), ethylene glycol, DMF (dimethyl formamide) and furfural.

Toteva, Topalova, and Manolova (Journal of the University of Chemical Technology and Metallurgy, 42, 1, 2007, pp. 17-20) mention that two-stage extraction of diesel fuel with DMF could reduce the aromatics and sulphur (from 2% wt to 0.33% wt) in a non-hydrotreated diesel fuel. This is not enough to meet heating fuel specifications for sulphur of less than 0.1% wt.

U.S. Pat. No. 6,320,090 (Sherman et al.) mentions that DMF could be used as a solvent to remove mostly poly aromatic hydrocarbons (PAH) as well as sulphur and nitrogen compounds from used oils that have been subjected to successive vacuum distillations.

Others have tried solvent extraction processes to remove sulphur compounds from fuel oils.

U.S. Pat. No. 5,753,102 (Funakoshi et al.) uses a mixture of acetone, water and iodine as the preferred solvent to remove sulphur from various straight run oils. They also tested more polarized solvents including DMF, acetonitrile, trimethyl phosphate, nitromethane, methanol, hexamethyl phosphoramide, acetic acid, pyridine, and N-methylperolidinone with less success.

U.S. Pat. No. 5,494,572 (Horii et al.) completes the sulphur removal from oil that has been hydrotreated using organic solvent containing nitrogen, specifically pyridinium salts, with another solvent containing hydroxyl groups, specifically one or more of water, methanol, ethanol, propanol, butanol, ethylene glycol, and glycerol. Hydrotreating is the more costly process.

In the process described by U.S. Pat. No. 5,059,303 (Taylor et al.), oils produced via cracking processes, ranging from cracked naphtha, gasoil and vacuum residue, are contacted with an extraction solvent to reduce their sulphur and nitrogen content prior to hydrotreating. The solvents used are polarized and in an aqueous solution. They include N-methyl pyrrolidone, furfural, DMF, and phenol.

U.S. Pat. No. 4,405,448 (Googin et al.) mention a polar solvent, specifically DMF and water, intended to remove polychlorinated biphenyls (PCB) from transformer oil. A second extraction using a non-polar solvent, chosen from normal pentane to normal octane, is intended to remove the PCB from the polar solvent.

For the past ten years, several oil desulphurization processes use an oxidizing agent and a catalyst to oxidize mercaptans and thiols in the oil. In a second step, polarized solvents are used to extract the sulphur oxides from the oil.

U.S. Pat. No. 6,274,785 (Gore) uses dimethylsulfoxide as the extraction solvent.

Canadian Patent No. 1,287,007 (Kittrel et al.) suggests using solvents having a dipole moment greater than 2, mixed with water, to extract the sulphur and nitrogen oxides from the oil.

U.S. Pat. No. 5,154,817 (Reid) mentions that cracked oils can be stabilized with additive injection. However, additives do not remove mercaptans and thiols from the oil.

The complete solvent regeneration is difficult because the solvents and the oils to treat have similar boiling points and gravities. Solvent losses render these processes impractical.

There was therefore a need for a new process able to stabilize, desulphurize, neutralize and dry wide range diesel, which process being free of at least one of the drawbacks of the prior processes.

There was therefore also a need for a process able to stabilize, desulphurize, neutralize and dry the heating oil to meet the heating oil specifications, which process being free of at least one of the drawbacks of the prior processes.

There was a further need for a process that would also be effective in reducing the sulphur in diesel cuts produced by catalytic or thermal cracking of heavy oils in refineries.

There was particularly a need for a low cost process to stabilize and remove contaminants from wide range diesels or gasoils that can be used in smaller plants, such as used oil cracking units.

There was a further need for new stabilized wide range diesel obtained from an unstable oil.

There was also a need for uses of a stabilized and/or desulphurized wide range of diesel.

SUMMARY

A first object of the present invention is the process to stabilize and to remove contaminants from an unstable oil, the process comprising at least one step of mixing the unstable oil with an impure solvent having a dipole moment greater than 2.

According to a preferred embodiment, the processes allow to stabilize and to remove contaminants from an unstable oil, wherein the unstable oil is selected among the family of: mixtures made for at least 50% wt of hydrocarbons which may include free radicals, oils produced by thermal cracking, oils obtained by catalytic cracking, oils obtained by decomposition, oils obtained by degradation, and the mixtures of at least two of the latter oils.

Advantageously, in order to stabilize and to remove contaminants from an unstable oil, the process includes at least one step of contacting a stream of the unstable oil with a solvent having a dipole moment greater than 2 and, thus, obtaining two mixtures, the first mixture being of an oil-solvent type and containing impurities, and the second mixture being of a solvent-oil type and containing residues and impurities, the impurities in the solvent-oil mixture being identical to, or different from, the impurities in the oil-solvent mixture.

According to another preferred embodiment of the invention, in the processes at least a fraction of the solvent having a dipole moment greater than 2 that is present in at least one of the two mixtures is extracted from the mixture(s) and is at least partially regenerated before being recycled to the process.

According to a further preferred embodiment of the invention, the processes comprise the following steps of:
a) intimately contacting a stream of the unstable oil with a solvent having a dipole moment greater than 2 and, thus, obtaining two mixtures, the first mixture being of an oil-solvent type and containing impurities, and the second mixture being of a solvent-oil type and containing residues and impurities, the impurities in the solvent-oil mixture being identical or different from the impurities in the oil-solvent mixture;
b) separating the treated oil, present in the oil-solvent mixture obtained in step a), from the solvent, leaving most of the impurities in the solvent phase;
c) separating the solvent and the oil, present in the solvent-oil mixture obtained in step a), from the residues, leaving preferably at least 90% wt of the contaminants in the residues;
d) optionally separating the solvent and the light oil present in the oil-solvent mixture obtained in step b);
e) optionally separating the solvent and the oil obtained in step c); and
f) recycling at least one of the solvents obtained in steps b), c), d) or e), wherein each of the solvent is at least partially regenerated.

The processes of the invention are particularly suited to stabilize and to remove contaminants from an unstable oil, wherein, in step b), at least 80% wt, preferably at least 90% wt, of the impurities remain in the solvent phase.

Advantageously, in step f), at least one of each of the solvent is regenerated for at least 50% wt but for less or equal to 99% wt, and preferably for at least 55% wt but for less or equal to 98% wt, before recycling.

Preferably, in step f), at least one of each of the solvent is regenerated by physical means such as distillation, vacuum distillation, including thin film or wiped film evaporation, azeotropic distillation, and or centrifuging.

Advantageously, in step f), at least one of each of the solvent is regenerated by using vacuum distillation and/or centrifuging.

The processes of the invention are of a particular interest wherein the boiling range of the unstable oil, as measured by the method ASTM D86, ranges from 125° C. to 500° C. and preferably when the boiling range ranges from 175° C. to 450° C.

Advantageously, the boiling range of the treated oil in step a), as measured by the method ASTM D86, ranges from 125° C. to 500° C. and more preferably ranges from 175° C. to 450° C.

The processes of the invention are of a particular interest when applied to unstable oils produced by cracking used oil, heavy oil, bitumen, vacuum gasoil, vacuum residue, tar, synthetic crude oil, bunker or is produced by cracking a mixture of at least two of these solvents.

Advantageous results are obtained when the initial solvent is chosen among N-methyl pyrrolidone, furfural, dimethyl formamide, phenol, pyridine dimethyl acetamide, dimethyl sulfoxide and propylene carbonate, and among mixtures of at least 2 of these.

According to a further embodiment the invention, the process, to stabilize and to remove contaminants from an unstable oil, wherein the regenerated solvent, obtained in steps b), c), d) and/or f), still contains some impurities or reaction products.

The processes of the invention are of a particular interest, when the contaminants present in the treated or untreated unstable oil include: water, sulphur compounds such as mercaptans and thiols, organic chlorides, organic and inorganic acids, free radicals, resins, gums, sediments, reaction products and mixtures of at least two of these.

The solvent concentration in the regenerated solvent stream obtained, in step f), advantageously ranges from 50% wt to 99% wt.

Advantageously, the solvent concentration in the regenerated solvent stream obtained, in step f), ranges from 70% wt to 90% wt and is more preferably about 83% wt.

According to a preferred embodiment of the invention, the regenerated solvent is produced, in step f), by a physical process such as distillation and/or centrifugation. The distillation is thus advantageously performed at pressures ranging from 0.5 psia to 15 psia, advantageously from 0.55 psia to 12 psia, preferably the distillation pressures ranging from 0.6 psia to 12 psia, advantageously from 0.7 psia to 4 psia and more preferably the distillation is performed at pressures about 1.5 psia.

Advantageously, the regenerated solvent is produced, in steps b), c), d), and f), by distillation conducted at temperatures ranging from 50° C. to 350° C., more preferably distillations are thus conducted at temperatures ranging from 100° C. to 175° C., and more preferably at a temperature of about 130° C.

The processes of the invention are of a particular interest when the impurities, present in the regenerated and/or recycled solvent, have a boiling temperature ranging from 120° C. to 250° C., and more preferably in the case wherein the impurities, present in the regenerated and/or recycled solvent, have a boiling temperature ranging from 130° C. to 200° C.

The processes are very efficient when the impurities, present in the regenerated and/or recycled solvent, have catalytic and/or solution enhancing and/or bridging properties.

The processes are very efficient when in step a) the solvent extraction is carried out at temperatures not exceeding the decomposition temperature of the solvent. In the case of DMF, the temperature is advantageously 10% above the boiling point of the solvent and not exceeding 400° C. Preferably, in the particular case of DMF, the solvent extraction is carried out at temperatures ranging from 8° C. to 175° C., more preferably at temperatures ranging from 15° C. to 155° C., advantageously from 15° C. to 150° C., more advantageously at temperatures ranging from 10° C. to 40° C., and more preferably at a temperature of about 25° C.

Advantageously, the solvent extraction in step b) is carried out as soon as possible after the unstable oil is produced, preferably after less than 1 day, and more preferably after less than 5 minutes after the cracked oil is produced.

According to a preferred embodiment, the initial solvent to oil volume ratio ranges from between 5/1 and 1/5, preferably this ratio is between 2/1 and 1/2; more preferably about 1/1.

Advantageously, step a) of the processes is performed in a continuously stirred extraction column.

Advantageously, step b) of the processes is performed by using at least one of the following separation techniques such as: in a thin film evaporator, in a wiped film evaporator, azeotropic distillation and/or in a centrifuge or by combination of at least two of these methods.

According to another preferred embodiment of the process of the invention to stabilize and remove contaminants, step c) of the processes is advantageously performed by physical separation such as settling, vacuum flashing, distillation in a thin film evaporator, in a wiped film evaporator, azeotropic distillation, and/or in other separation equipment such as a centrifuger or by combination of at least two of these methods.

Advantageously, step d) of the processes is performed by phase accumulation, or in a wiped film evaporator or in a centrifuge or by combination of at least two of these methods.

The processes of the invention are of a particular for treating contaminated wide range diesel fuel, the initial solvent is thus advantageously a nearly pure solvent having a dipole moment greater than 2.

The stable operation of the processing unit, wherein the operating conditions remain unchanged, may be reached, depending upon the size of the unit and/or upon the type of the unit and/or upon the solvent, in between 5 and 120 minutes, and preferably in about 45 minutes.

The processes of the invention are also of a particular interest for treating thermally cracked oils or thermally cracked used oil, and the initial solvent, having a dipole moment greater than 2, is thus advantageously DMF.

In the processes of the invention, the initial temperature in step a) is between 15° C. and 110° C., preferably between 20° C. and 30° C., and the initial temperatures in steps b), c) and d) are between 10° C. and 175° C. and more preferably is about 25° C.

In the processes of the invention, the initial pressures in steps b), c) and d) are between 0.5 psia and atmospheric pressure.

According to a preferred embodiment, the temperatures in the various steps of the processes are determined by the vacuum distillation obtained, but kept below the thermal decomposition temperature of the solvent and/or the cracking or polymerization initiation temperatures of the oil.

Advantageously, the equilibrium temperature in step a) is between 15° C. and 100° C., and most preferably about 25° C.

The solvent content in the recycled solvent stream is preferably between 50% wt and 99% wt, more preferably between 60% wt and 95% wt, and most advantageously about 83% wt.

According to further preferred embodiments of the invention:
  the temperatures in steps b), c) and d) are between 10° C. and 175° C.; and/or
  the pressures in steps b), c) and d) are between 0.5 psia and atmospheric pressure; and/or
  the residual water content in the stabilized diesel obtained is less than 1% wt, preferably less than 0.25% wt; and/or
  the residual water content in the stabilized diesel, obtained in step a), is less than 1% wt, preferably less than 0.25% wt.

A second objet of the present invention is constituted by the family of the stabilized diesels obtained by any one of the processes defined in the first object of the present invention.

These stabilized diesels are, according to ASTM method D6468, stable for at least a day, advantageously for at least a week, or until it is used, and most preferably they are stable for about 6 months or more.

Among the stabilized diesels obtained by the processes of the invention, these having at least one of the following properties:
- a sulphur content, according to ISO 8754, that is less than 0.2% wt, preferably less than 0.1% wt, and more preferably about 0.08% wt, are of a particular interest;
- a boiling temperature, according to ASTM D-86, that is comprised between 150° C. and 500° C., preferably between 175° C. and 450° C.;
- an abnormal peak in the ASTM D-86 curb in the in the area of the peak of recycled solvent, i.e. of the solvent that passes at least once through the process, preferably in the 0 to 10% area of distilled volume, and more advantageously in the area of 5% of distilled volume, appears to be new and are of a particular interest;
- a total acid number, according to ASTM 996, that is lower than 4, preferably lower than 1; and
- a cetane index over 40.

A third object of the present invention is constituted by the family of new stabilized diesels showing:
- according to ASTM method D6468, a stability for at least a day, or until it is used;
- according to ASTM method D1500, a colour index that is lower than 3; and
- an abnormal peak, in the ATM D-86 curb, in the 0 to 10% area of distilled volume.

Preferably, new stabilized diesel of the invention has a boiling temperatures range that is, according to ASTM D-86, comprised between 150° C. and 450° C.

A fourth objet of the present invention is made by the uses of a stabilized fuel obtained by one of the process defined in the first object of the present invention, or as defined in the second and third object of the present invention, as:
- a fuel, or a component in a blended fuel, such as a home heating oil, a low sulphur marine fuel, a diesel engine fuel, a static diesel engine fuel, power generation fuel, farm machinery fuel, off road and on road diesel fuel; and/or
- a cetane index enhancer; and/or
- a drilling mud base oil or component, preferably in the same way as currently produced wide range diesels are used; and/or
- a solvent or component of a solvent; and/or
- a diluent for heavy fuels, bunker or bitumen; and/or
- a light lubricant or component of a lubricating oil; and/or
- a cleaner or a component in oil base cleaners; and/or
- a flotation oil component; and/or
- a wide range diesel; and/or
- a clarified oil; and/or
- a component in asphalt blends.

As an illustrative and non-limitative example of use as a cetane index enhancer, if a refinery has 10,000 barrels of diesel fuel with a cetane index of 38, adding 1,000 barrels of a new stabilized oil of the invention, with a 60 cetane index, will bring the combined 11,000 barrels to the specified 40 cetane index for road diesel in North America.

As an illustrative and non-limitative example of use as flotation component, when mixed with a product such as a refinery's catalytic cracker fractionators bottom oil (CCFB). The ratio of stabilized oil to CCFB can vary between 1/0.5 and 1/5 depending on the type of ore entering the floatation cell, its concentration, particle size, density and temperature.

In a preferred embodiment of the invention, the stabilized diesel, are used in a mixture in combination with:
- conventional diesel fuels, low sulphur diesels or wide range diesel oils; and/or
- bitumen, light or heavy vacuum gasoil, heavy fuels, bunker, tar or asphalt products; and/or
- refinery intermediate streams such as catalytic cracker fractionators bottoms; and/or
- organic solvents; and/or
- water and/or additives to make specialty products such as drilling muds or fractionating oils; and/or
- lubricating base oils, greases and additives to make lube oils or greases.

DETAILED DESCRIPTION

Preliminary Definitions

Unstable oils: are mixtures mainly made of hydrocarbons that may degrade, for example by aging and/or heating and/or under oxidizing conditions such as air exposition, oxygen exposition, high temperatures and/or in the presence of catalysts. This expression more particularly covers any mixtures of hydrocarbons containing free radicals (and more specifically those mixtures containing at least 50% wt of hydrocarbons), any oil which colour deteriorates when exposed to heat or/and oxygen and/or other oils; any oils produced by thermal cracking and/or oils obtained by catalytic cracking and/or oils obtained by decomposition and/or unstable oils obtained by degradation, and the mixtures of at least two of the latter unstable oils; the processes of the invention are suited for stabilizing any such unstable oils in the broader sense Wide range diesel: are oils mainly based on mixtures of hydrocarbons with boiling points between 100° C. and 500° C.

Impurities: one or more chemical compounds that may be unwanted in a mixture but that may finally assist the extraction process.

Residues: contaminant and by-products obtained by reaction and/or extraction, that are unwanted and to be eliminated.

GOn: gasoil (wide range diesels) in different steps of the process of the invention, n is a numerical index, an integral number, each of these integers corresponding to step of the process and represent changes in composition.

Initial solvent: solvent introduced at the beginning of the process and before its contamination by the solubilizing component.

Figure 1:
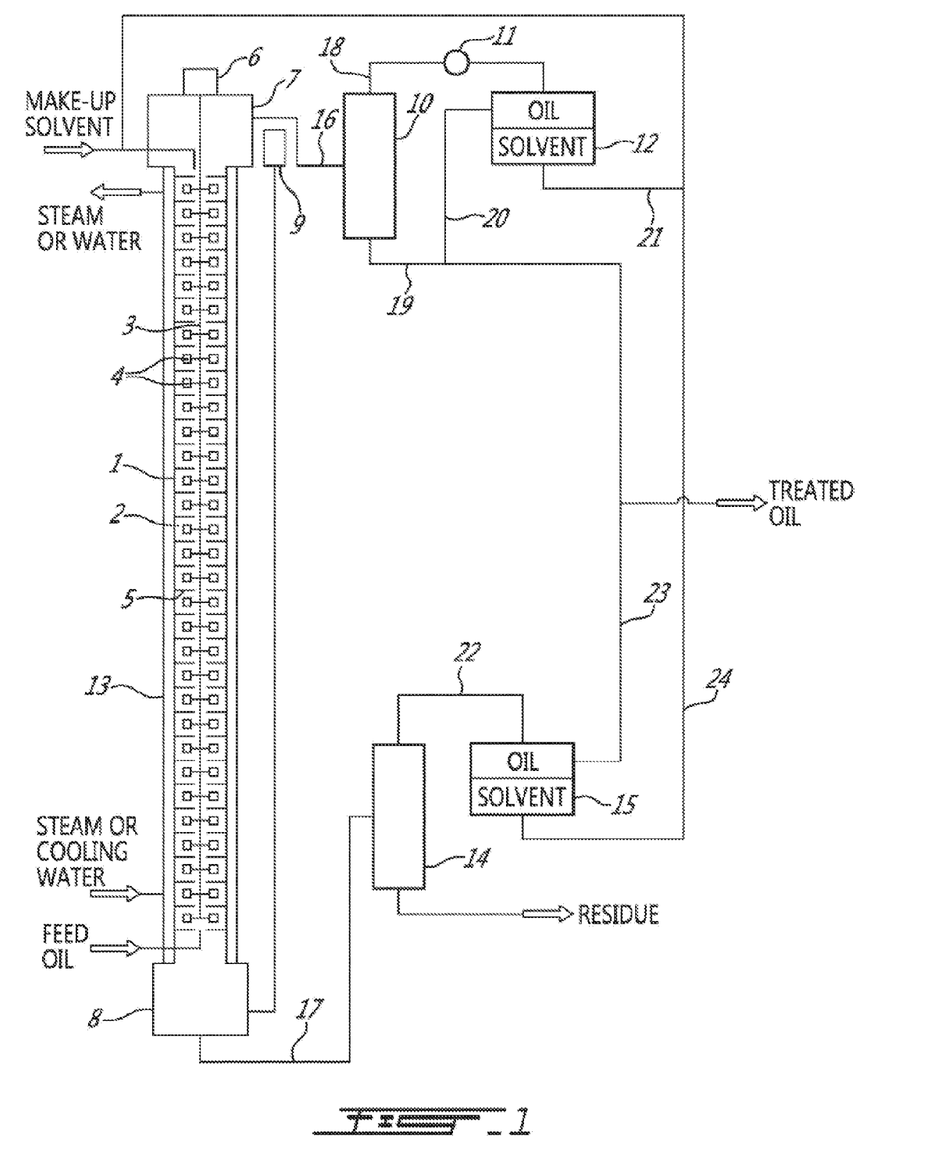
FIG. 1 is a simplified flow sheet that illustrates an example of an embodiment of a process according to the invention.

FIG. 1 is a simplified flow sheet that illustrates an example of an embodiment of a process according to the invention. As shown, pure DMF (dimethyl formamide) and/or recycled DMF is introduced at the top of a continuously stirred contactor (1), while the cracked oil to be treated is introduced at the bottom of the column. A decanter (7) at the top of the column separates the raffinate (16) from the DMF. A decanter (8) at the bottom of the column separates the extract (17) from the oil to be treated. The column has up to 30 compartments (2), separated from each other by a disc with a hole in the middle (5). A stirrer shaft (3) equipped with paddles (4) ensures good mixing of the solvent with the oil at each level. The stirrer motor (6) is mounted at the top of the top decanter (7). The oil level in the contacting column is held with a level controller or simply with a column of liquid (9) using the principle of communicating of vases. A jacket (13) surrounding the extraction column maintains a constant temperature in the column with steam or cooling water as required.

The raffinate (16) is routed to a vacuum distillation column (10). The solvent and some light diesel exit through the top of the column (18). They are cooled and condensed in a condenser (11), and allowed to separate in an accumulator (12). The treated diesel (19) exits from the bottom of the column, cooled, mixed with the oil recovered from the solvent (23) and the light oil phase from the accumulator (20) and sent to storage.

Another method to recover the solvent in the raffinate is to centrifuge the raffinate. However, the separation between the solvent and the oil is not as good as in the vacuum distillation recovery method. The solvent losses increase.

The extract (17), drawn from the bottom of the bottom decanter (8), is routed to another vacuum distillation column (14) to recover the solvent and oil, exiting from the top of the column (22), from the residue, exiting from the bottom of the column. After passing through a separator (15), the solvent (24) is recycled to the extraction column, along with the solvent (21) from the oil recovery column. The oil (23) is routed to storage, along with streams (19) and (20). The portion of the recycled solvent boiling between 150° C. and 250° C. contains the solutizing components.

EXAMPLES

Figure 2:
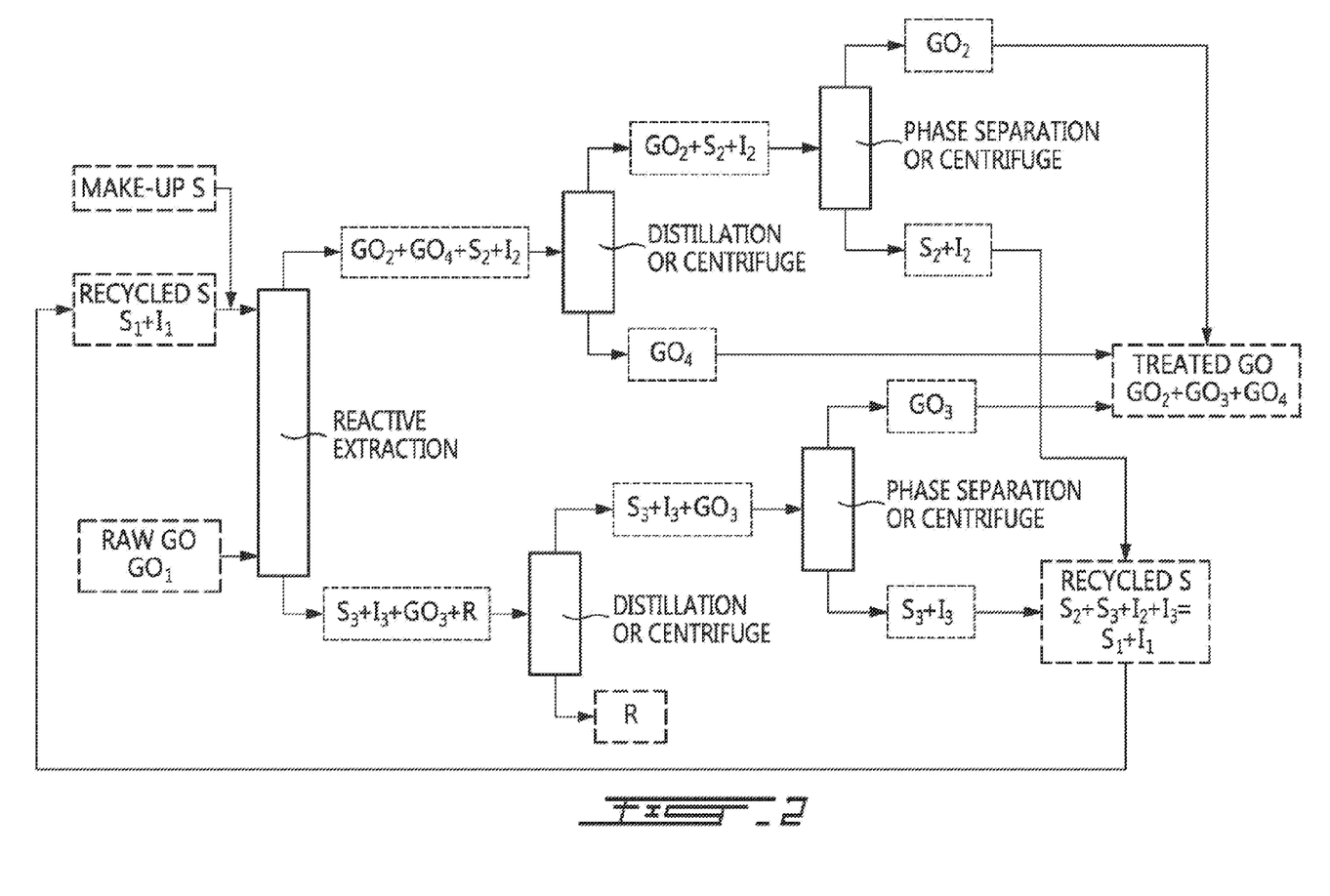
FIG. 2 is a block diagram illustrating the steps performed, and the streams produced while operating in the preferred embodiment described herein.

The invention will now be further illustrated by mean of the following non limiting examples 1 to 4. All four examples were performed using the purification unit illustrated in FIG. 1 and the reactive solvent extraction according to block diagram in FIG. 2. Except for Example 1, wherein the methanol was introduced at the bottom of the extraction column and the unstable oil at the top of the extraction column. In FIG. 2, "S" refers to the solvent, "GO" refers to the gasoil (or wide range diesel), "I" refers to the impurities, "R" refers to the residue, and indicia "1, 2, 3, 4" indicate varying concentrations and stages in the process.

Recycled DMF from the process, or from another source, along with make-up DMF, is measured and introduced at the top of a continuously stirred extraction column (a), 6 cm in diameter and 250 cm high. Wide range diesel produced from used oil in a thermal cracker is measured and introduced at the bottom of the same column. The column's 111 cm stirred section is divided into three parts, each part containing ten cells. The cells are divided from one another by a horizontal, doughnut-shape baffle. The stirrer's shaft, in the middle of the column, is equipped with two paddles per cell. The variable speed stirrer can turn at between 50 rpm and 150 rpm. The envelope around the contactor maintains stable temperatures in the contactor with circulating water or steam. The contactor operates at atmospheric pressure and 25° C. The stirrer turns at around 100 rpm. The decanter at the top of the contactor column separates the raffinate from the solvent and the decanter at the bottom of the column separates the extract from the feed diesel. The level in the contactor is maintained with a container, attached by a tube to the contactor, and placed at variable heights. The extract and raffinate are weighted and sent off plot for solvent recovery by vacuum distillation or centrifuging at 10,000 rpm of both the extract and the raffinate.

Example 1

Use of Methanol in the Process

Table I, Experiment 1, illustrates the best results obtained using methanol as solvent. For this experiment, the column was heated to 50° C. (122° F.).

Although the oil is stabilized, its sulphur content is unchanged by the extraction process, and its flash point is reduced below the 55° C. (131° F.) specified for heating oil in Europe.

TABLE I

EXPERIMENT No 1: Solvent at 99.9% wt Methanol, Feed diesel/ solvent ratio = 3/2

| | Method | Units | Feed Diesel | Product Diesel |
|---|---|---|---|---|
| Density | ISO 3675 | Kg/l | 0.85 | 0.84 |
| Sulphur | ISO 8754 | % m/m | 0.366 | 0.366 |
| Water | ISO 10336 | mg/kg | 0.13 | 0.02 |
| Total Acid Number | | mg KOH/g | 4.23 | 0.8 |
| Flash Point | ASTM D92 | C. | 69 | 26 |
| Micro Carbon Residue | ISO 10370 | % m/m | 0.6 | 0.3 |
| Cetane Index | EPCN 322 | | 53.9 | 59.1 |
| Colour after 1 day exposed to air | ASTM D1500 | | 8 | 3 |
| Colour after 5 months exposed to air | ASTM D1500 | | 7 | 4 |

It is to be noted that the methanol extraction does not reduce the sulphur content the treated diesel.

Example 2

Use of DMF—Pure (99.9% wt)

Table II illustrates the results of three experiments using the polarized solvent: dimethyl formamide (DMF).

In all experiments, the oil is stabilized and keeps its light yellow colour for at least 6 months.

The flash point is unchanged in the extraction process. The net heating value is also unchanged.

The sulphur content is reduced in all three tests. There is a 63% reduction in sulphur content when pure solvent is used. When a solvent that is not completely regenerated is used, the sulphur removal is improved to meet the new European sulphur specifications for heating oil of less than 0.1% wt. The water content of the oil is also reduced to below the 250 ppm specification.

TABLE II

EXPERIMENT No 2: Solvent at 99.9% wt DMF, Feed diesel/solvent ratio = 1/1

| | Method | Units | Feed Diesel | Product Diesel |
|---|---|---|---|---|
| Density | ISO 3675 | Kg/l | 0.844 | 0.828 |
| Sulphur | ISO 8754 | % m/m | 0.322 | 0.119 |
| Water | ISO 10336 | mg/kg | 0.077 | 0.009 |
| Total Acid Number | | mg KOH/g | 4.37 | 1.13 |
| Flash Point | ASTM D92 | C. | 69 | 66 |
| Micro Carbon Residue | ISO 10370 | % m/m | 0.53 | 0.047 |
| Cetane Index | EPCN 322 | | 54.8 | 60.7 |
| Colour after 1 day exposed to air | ASTM 1500 | | 6 | 1 |
| Colour after 5 months exposed to air | ASTM 1500 | | 7 | 1.5 |

Example 3

Contaminated DMF—at 83.4% Wt in the Solvent Feed Stream

The same experiment as in example 1 and 2 is performed, except that the solvent is at 83.4% wt DMF, Feed diesel/solvent ratio=1/1.

TABLE III

EXPERIMENT No 3: Solvent at 83.4% wt DMF, Feed diesel/solvent ratio = 1/1

| | Method | Units | Feed Diesel | Product Diesel |
|---|---|---|---|---|
| Density | ISO 3675 | Kg/l | 0.844 | 0.834 |
| Sulphur | ISO 8754 | % m/m | 0.339 | 0.066 |
| Water | ISO 10336 | mg/kg | 0.098 | 0.012 |
| Total Acid Number | | mg KOH/g | 1.54 | 0.15 |
| Flash Point | ASTM D92 | C. | 69 | 57 |
| Cetane Index | EPCN 322 | | 57.1 | 60.2 |
| Colour after 1 day exposed to air | ASTM D1500 | | 6 | 1 |
| Colour after 5 months exposed to air | ASTM D1500 | | 7 | 1.5 |

Figure 3:
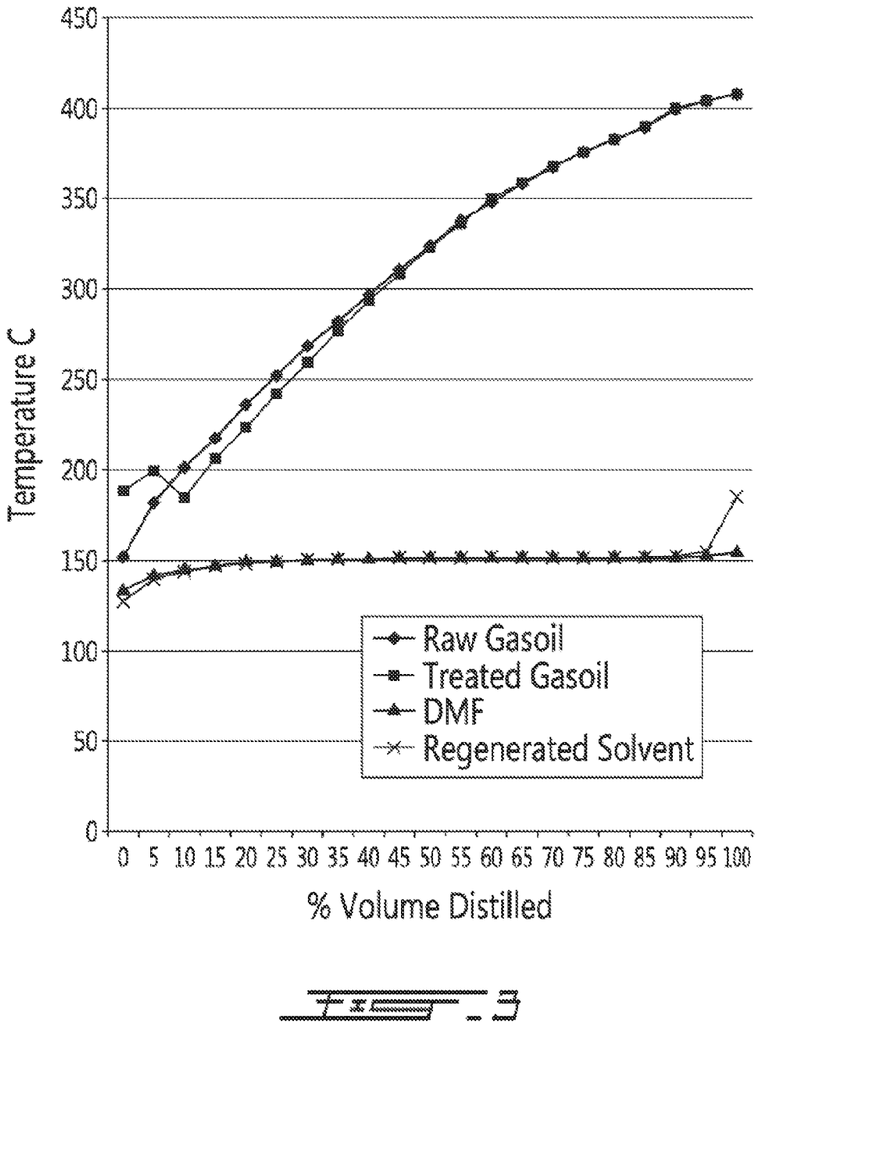
FIG. 3 is a distillation curve of raw and treated gasoil, along with the distillation curves of pure and recycled solvent; of the wide range diesel obtained by the process according to the invention, as further specified in example 3 thereafter.
Figure 4:
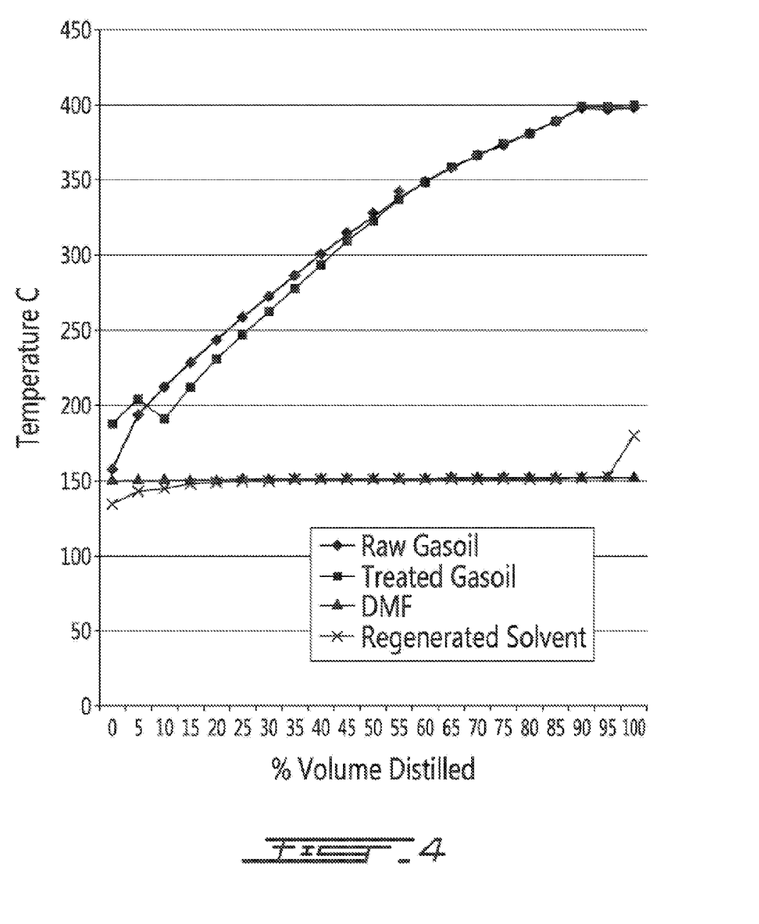
FIG. 4 is another distillation curve of raw and treated gasoil, along with the distillation curves of pure and recycled solvent, of the wide range diesel obtained by a process according to the invention, as further specified in example 4 thereafter.

Note the abnormality in the 0 to 10% cut of the treated gasoil, and the corresponding heads and tails in the recycled solvent curve. The distillation curves in FIGS. 2 and 3 demonstrate that the "solutizers" in this process have boiling points between 125° C. and 200° C. With another solvent, the "solutizers" may have a different boiling point range.

Example 4

Contaminated DMF: 77.25% Wt in the Solvent Feed Stream

The same experiment as in example 1 and 2 is performed, except that the solvent contains 77.25% wt DMF, Feed diesel/solvent ratio=1/1

TABLE IV

EXPERIMENT No 4: Solvent at 77.25% wt DMF, Feed diesel/solvent ratio = 1/1

| | Method | Units | Feed Diesel | Product Diesel |
|---|---|---|---|---|
| Density | ISO 3675 | Kg/l | 0.844 | 0.834 |
| Sulphur | ISO 8754 | % m/m | 0.315 | 0.086 |
| Water | ISO 10336 | mg/kg | 0.11 | 0.011 |
| Total Acid Number | | mg KOH/g | 4.27 | 0.56 |
| Flash Point | ASTM D92 | C. | 53 | 60 |
| Micro Carbon Residue | ISO 10370 | % m/m | 0.544 | 0.086 |
| Cetane Index | EPCN 322 | | 54.2 | 60 |
| Colour after 1 day exposed to air | ASTM D1500 | | 5.5 | 1.5 |
| Colour after 5 months exposed to air | ASTM D1500 | | 7 | 1.5 |

These experiments show that the impurities in the incompletely regenerated solvent facilitate the mass transfer of sulphur compounds from the gasoils to the solvent, as did the solutizers for light oils in older patents.

The incompletely regenerated solvent was obtained by heating the extract to 170° C. in a thin film evaporator operating at 120 mBar.

Example 5

Use as Cetane Index Enhancer

In the case of a refinery having 10,000 barrels of diesel fuel with a cetane index at 38, adding 1,000 barrels of the new stabilized oil, with a 60 cetane index, obtained in previous example 4, will bring the combined 11,0000 barrels to the specified 40 cetane index for road diesel in North America.

Example 6

Use in a Drilling Mud Base Oil or Component

The new stabilized oil obtained in previous example 3 is mechanically incorporated in a drilling fluid according to the protocol described in U.S. Pat. No. 2,994,660, where diesel oil is mixed with an aqueous phase containing a variety of chemicals. The ratio of oil phase to water phase ranges from 80/20 to 35/65 preferably about 50/50 resulting in a new invert emulsion drilling fluid.

Example 7

Use in as Flotation Oil Component

In order to get the floatation oil a refinery's catalytic cracker fractionators bottom oil (CCFB) is mixed with the new stabilized oil obtained in previous example 4. The ratio of stabilized oil to CCFB can vary between 1/0.5 and 1/5 depending on the type of ore entering the floatation cell. In the present example the ratio of stabilized oil to CCFB is of 1/5 and the ore is of the potash type. The temperature in the flotation cell is about 15° C.

The resulting flotation composition is advantageously used in Canada.

ADVANTAGES OF THE INVENTION

The extraction process described in this patent stabilizes, dries and neutralizes wide range diesel, while removing most of the sulphur, chlorine, and water. As in other extraction processes researched, complete regeneration of the solvent is difficult because DMF or other solvents having a dipole moment greater than 2 disintegrate around 350° C. (or at other temperatures depending upon the selected solvent). Usually azeotropic distillation is used, with water as the third component. However, in this case, complete regeneration of the DMF is not necessary, or even desirable, since the extraction process is more effective when reaction products from previous passes are present in the solvent.

This invention is a simple and low cost process to stabilize, desulphurize, neutralize and dry unstable oils, containing free radicals, such as those oils produced by thermal or catalytic cracking of heavier oils. It can be used as a product oil finishing process in a used oil plant, to debottleneck a hydrotreating unit in a refinery or as a diesel of finishing step in a refinery. The extraction is performed at ambient temperatures and pressures. The solvent can be regenerated with a simple vacuum distillation or centrifuge. It does not require an azeotropic distillation to achieve near complete regeneration, since complete, regeneration is not desired. Oxidation of the mercaptans, thiols, and nitrogen compounds prior to their extraction from the oil is not required. In the case of used oil plants, a gasoil meeting all European heating oil specifications can be produced without hydrotreating.

Although the present invention has been described with the aid of specific embodiments, it should be understood that several variations and modifications may be grafted onto the embodiments and that the present invention encompasses such modifications, usages or adaptations of the present invention that will become known or conventional within the field of activity to which the present invention pertains, and which may be applied to the essential elements mentioned above.

What is claimed is:

1. A process to stabilize and to remove contaminants from unstable oil, the process comprising the following steps of:
   a) intimately contacting a stream of the unstable oil with an initial solvent chosen among N-methyl pyrrolidone, furfural, dimethyl formamide, phenol, pyridine, dimethyl acetamide, dimethyl sulfoxide, propylene carbonate, and mixtures thereof to obtain two mixtures, a first mixture being of an oil-solvent type, which comprises treated oil, solvent, and impurities, and a second mixture being of a solvent-oil type, which comprises treated oil, solvent, residues, and impurities;
   b) separating the treated oil, present in the first mixture obtained in step a), from the solvent, leaving most of the impurities in the solvent phase;
   c) separating the solvent and the treated oil, present in the second mixture obtained in step a), from the residues; and
   d) recycling, in the process, one or more solvents with impurities, recovered in steps b) or c), and partially regenerated before being recycled to said process;
wherein in step b) at least 80% of the impurities remain in the solvent phase;
wherein in step d), at least one of each of said solvent is regenerated, for more than 50% wt. but for less or equal to 98% wt. to obtain a regenerated solvent stream, before recycling;
wherein the initial solvent to unstable oil ratio ranges from between 5/1 to 1/5; and
optionally, wherein the treated oil recovered from the first mixture is mixed with the treated oil recovered from the second mixture.

2. The process according to claim 1 to stabilize and to remove contaminants from an unstable oil, wherein the unstable oil is selected from the group consisting of a mixture comprising at least 50% wt. of hydrocarbons, wherein said mixture optionally includes free radicals, an oil containing free radicals, an oil whose color deteriorates over time and/or when exposed to heat and/or oxygen and/or oxidizing chemicals and/or other oils, an oil produced by thermal cracking, an oil obtained by catalytic cracking, an oil obtained by decomposition, an oil obtained by degradation, and mixtures thereof.

3. The process according to claim 1 to stabilize and to remove contaminants from an unstable oil, wherein in step the solvent is regenerated by using one or more methods selected from the group consisting of distillation, vacuum distillation, azeotropic distillation, and centrifugation.

4. The process according to claim 3 to stabilize and to remove contaminants from an unstable oil, wherein in step the solvent is regenerated by using one or more methods selected from the group consisting of distillation, vacuum distillation, and centrifugation.

5. The process according to claim 1 to stabilize and to remove contaminants from an unstable oil, wherein the boiling point of the unstable oil, as measured by the method ASTM D86, ranges from 125° C. to 500° C.

6. The process according to claim 5 to stabilize and to remove contaminants from an unstable oil, wherein the boiling point of the unstable oil, as measured by the method ASTM D86, ranges from 175° C. to 450° C.

7. The process according to claim 1 to stabilize and to remove contaminants from an unstable oil, wherein the boiling point of the treated oil in step a), as measured by the method ASTM D86, ranges from 125° C. to 500° C.

8. The process according to claim 7 to stabilize and to remove contaminants from an unstable oil, wherein the boiling point of the treated oil in step a), as measured by the method ASTM D86, ranges from 175° C. to 450° C.

9. The process according to claim 1 to stabilize and to remove contaminants from an unstable oil, wherein the unstable oil is produced by cracking one or more components selected from the group consisting of used oil, heavy oil, bitumen, vacuum gasoil, vacuum residue, tar, synthetic crude oil, and bunker.

10. The process according to claim 1 to stabilize and to remove contaminants from an unstable oil, wherein the initial solvent is one or more solvents selected from the group consisting of N-methyl pyrrolidone, phenol, pyridine, dimethyl acetamide, dimethyl sulfoxide and propylene carbonate.

11. The process according to claim 1 to stabilize and to remove contaminants from an unstable oil, wherein the solvent, in steps b), c) and/or d), optionally contains impurities and/or reaction products.

12. The process according to claim 1 to stabilize and to remove contaminants from an unstable oil, wherein the contaminants is selected from one or more of the group consisting of water, sulphur compounds, organic chlorides, organic and inorganic acids, free radicals, resins, gums, sediments, and reaction products, and mixtures thereof.

13. The process according to claim 12 to stabilize and to remove contaminants from an unstable oil, wherein the sulphur compounds are thiols.

14. The process according to claim 1 to stabilize and to remove contaminants from an unstable oil, wherein the solvent concentration in the regenerated solvent stream obtained, in step d) is from 50% wt. to 83% wt.

15. The process according to claim 14 to stabilize and to remove contaminants from an unstable oil, wherein the solvent concentration in the regenerated solvent stream obtained, in step d), is about 83% wt.

16. The process according to claim 1 to stabilize and to remove contaminants from an unstable oil, wherein the regenerated solvent in step d) is produced by distillation and/or centrifugation.

17. The process according to claim 1, wherein step c) further comprises separating the solvent and the treated oil, present in the second mixture obtained in step a), from the residues leaving at least 60% wt. of contaminants in the residues.

* * * * *

UNITED STATES PATENT AND TRADEMARK OFFICE
CERTIFICATE OF CORRECTION

PATENT NO. : 9,458,391 B2
APPLICATION NO. : 14/644628
DATED : October 4, 2016
INVENTOR(S) : Wheeler Page 1 of 1

It is certified that error appears in the above-identified patent and that said Letters Patent is hereby corrected as shown below:

In the Claims

Claim 3, Column 14, Line 11, "remove contaminants from an unstable oil, wherein in step" should read --remove contaminants from an unstable oil, wherein in step d),--

Claim 4, Column 14, Line 16, "remove contaminants from an unstable oil, wherein in step" should read --remove contaminants from an unstable oil, wherein in step d),--

Claim 12, Column 14, Line 58, "sediments, and reaction products, and mixtures thereof" should read --sediments, reaction products, and mixtures thereof.--

Signed and Sealed this
Eighteenth Day of April, 2017

Michelle K. Lee
*Director of the United States Patent and Trademark Office*